United States Patent [19]

Lewis

[11] 4,359,736

[45] Nov. 16, 1982

[54] FREQUENCY-PHASE CODING DEVICE

[75] Inventor: Bernard L. Lewis, Oxon Hill, Md.

[73] Assignee: The United States of America as represented by the Secretary of the Navy, Washington, D.C.

[21] Appl. No.: 209,370

[22] Filed: Nov. 24, 1980

[51] Int. Cl.$^3$ ............................................. G01S 13/28
[52] U.S. Cl. ............................................. 343/17.2 PC
[58] Field of Search ................................. 343/17.2 PC

[56] References Cited

U.S. PATENT DOCUMENTS

| | | |
|---|---|---|
| 3,163,862 | 12/1964 | Jenny . |
| 3,202,989 | 8/1965 | Kagawa et al. ............. 343/17.2 PC |
| 3,217,324 | 11/1965 | Adamsbaum et al. ... 343/17.2 PC X |
| 3,526,894 | 9/1970 | Guilhem et al. |
| 3,594,795 | 7/1971 | Thor et al. .................... 343/17.2 PC |
| 3,701,154 | 10/1972 | McKinney ................. 343/17.2 PC X |
| 3,714,653 | 1/1973 | Thor et al. .................... 343/17.2 PC |
| 3,858,219 | 12/1974 | Hull . |
| 3,866,224 | 2/1975 | Porter et al. |
| 3,945,012 | 3/1976 | Cooper . |
| 4,068,235 | 1/1978 | Peters, Jr. et al. |
| 4,078,234 | 3/1978 | Fishbein et al. |
| 4,123,755 | 10/1978 | Fishbein et al. |
| 4,167,737 | 9/1979 | Freedman ................... 343/17.2 PC |
| 4,237,461 | 12/1980 | Cantrell et al. ......... 343/17.2 PC X |

Primary Examiner—T. H. Tubbesing
Attorney, Agent, or Firm—Robert F. Beers; William T. Ellis

[57] ABSTRACT

A doppler-tolerant pulse-compression code generator for generating a plurality of approximately orthogonal codes which will prevent radar interference and suppress jamming. These codes are generated by phase-coding the frequency-band steps and also altering the time-sequence of the frequency steps of a step-approximation to a linear FM chirp pulse. Specifically, this code generator may comprise a circuit for modulating a carrier frequency with a video pulse of bandwidth B having a length less than or equal to a desired compressed pulse length, a tapped delay line having n signal taps for sequentially delaying this video pulse, a comb filter comprising a series of n bandpass filter channels each passing different spectral bands in the bandwidth B, a switching matrix for connecting each of the n signal taps to a different one of the n bandpass filters in a controlled manner, a phase-coding circuit in each bandpass filter channel for phase coding the signal passed through the respective bandpass filter channel, and an adding circuit for adding all of the phase-coded signals from the n bandpass filter channels to form one of a set of orthogonally coded pulses.

15 Claims, 2 Drawing Figures

FREQUENCY-PHASE CODING DEVICE

BACKGROUND OF THE INVENTION

The present invention relates generally to wide-band pulse-compression radar systems and, more particularly, to pulse-compression code generators for use within such systems to generate a plurality of orthogonal codes which suppress jamming.

Significant advantages can be gained by using wide band pulse radars employing large pulse compression ratios. Such radars permit smaller range resolution cells due to the wider bandwidth. The decreased volume of these smaller range cells allows less chaff dipoles or raindrops per cell. Accordingly, such wide band radars are not blinded by backscatter or clutter energy reflections from rain or chaff. Additionally, such wide band radars are difficult to jam from long range because of the large power required to exceed the increased thermal noise power (due to the wider bandwidth) at the radar receiver.

However, two radars using the same frequency space and code will interfere with each other, i.e., the pulse transmissions from one radar will be compressed and processed by the other radar's compression system. In order to permit many wide band radars to share the same spectral space without mutual interference, multiple sets of uncorrelated codes are required, i.e., the cross-correlation coefficient for the codes must be some very small value such that the matched filter for one pulse radar will not compress the echoes from the transmissions of other radars into one range resolution cell. Unfortunately, the only known coding technique that will permit orthogonal codes to be developed, i.e., pseudorandom phase coding, is intolerant of doppler shift and thus cannot be used with targets with different velocities because the doppler shift will scramble the phase coding.

In this respect, the most doppler tolerant pulse coding sequence is linear FM or step approximation to linear FM pulse coding. This doppler tolerance is due to the fact that any doppler shift on an echo will simply translate all of the frequency components of the pulse by approximately the same amount in the same direction. Accordingly, all of the frequencies within the radar pass band will still exit from the matched filter at the same time relative to each other to form a short pulse. This output pulse will then occur at an absolute time different from that which would have resulted in the absence of doppler, i.e., range doppler coupling. However, this range-doppler coupling characteristic causes linear FM coded pulses to be extremely susceptible to radar jamming. Such jamming is accomplished by repeating a radar pulse transmission back to the radar at a later point in time with a frequency offset. Such a frequency outset signal will have the same slope as the transmitted signal but it will compress at the radar receiver to indicate a target with a range offset from the true target by the percentage of the uncompressed pulse length equal to the percentage of the frequency offset. If the offset is "up" in frequency, then a false target will be generated at a range either greater than or less than the true target range depending on whether an "up" chirp or a "down" chirp pulse is used. Likewise, if the offset is "down" in frequency, then a false target will be generated at a range either less than or greater than the true target range depending on whether an "up" chirp or a "down" chirp pulse is used. Thus, an enemy repeater could create one or more apparent or false targets both in front of and behind the true skin return by using frequency offsets.

OBJECTS OF THE INVENTION

Accordingly, it is an object of the present invention to generate pulse compression codes which will allow a plurality of wideband receivers to share the same spectral space without mutual interference.

It is a further object of the present invention to generate a plurality of orthogonal codes of arbitrary length in a form which is doppler tolerant such that two or more wideband pulse compression radars may share the same spectral space.

It is a still further object of the present invention to generate a plurality of orthogonal codes which not only are doppler tolerant but will also suppress jamming.

Other objects, advantages, and novel features of the present invention will become apparent from the detailed description of the invention, which follows the summary.

SUMMARY OF THE INVENTION

Briefly, these and other objects are obtained by phase-coding the frequency band steps and also altering the time-sequence of the steps in a step-approximation to a linear FM chirp pulse. The embodiment disclosed herein comprises a signal generating circuit for generating a signal pulse of bandwidth B, a delay device with n signal taps spaced by equal delays $\tau$ for delaying the pulse generated by the pulse generating circuit by a series of equal delay increments, a filter bank having n bandpass filter channels approximately covering the bandwidth B, a multiplexing switch for connecting each one of the n signal taps to a different one of the n bandpass filters, a phase-coding circuit in each bandpass filter channel for phase coding the signal passed through that respective filter channel, and an adding circuit for adding all of the phase coded signals from the n bandpass filter channels sequentially to form one of a set of orthogonal coded pulses.

DETAILED DESCRIPTION OF THE PREFERRED EMBODIMENT

Figure 1:
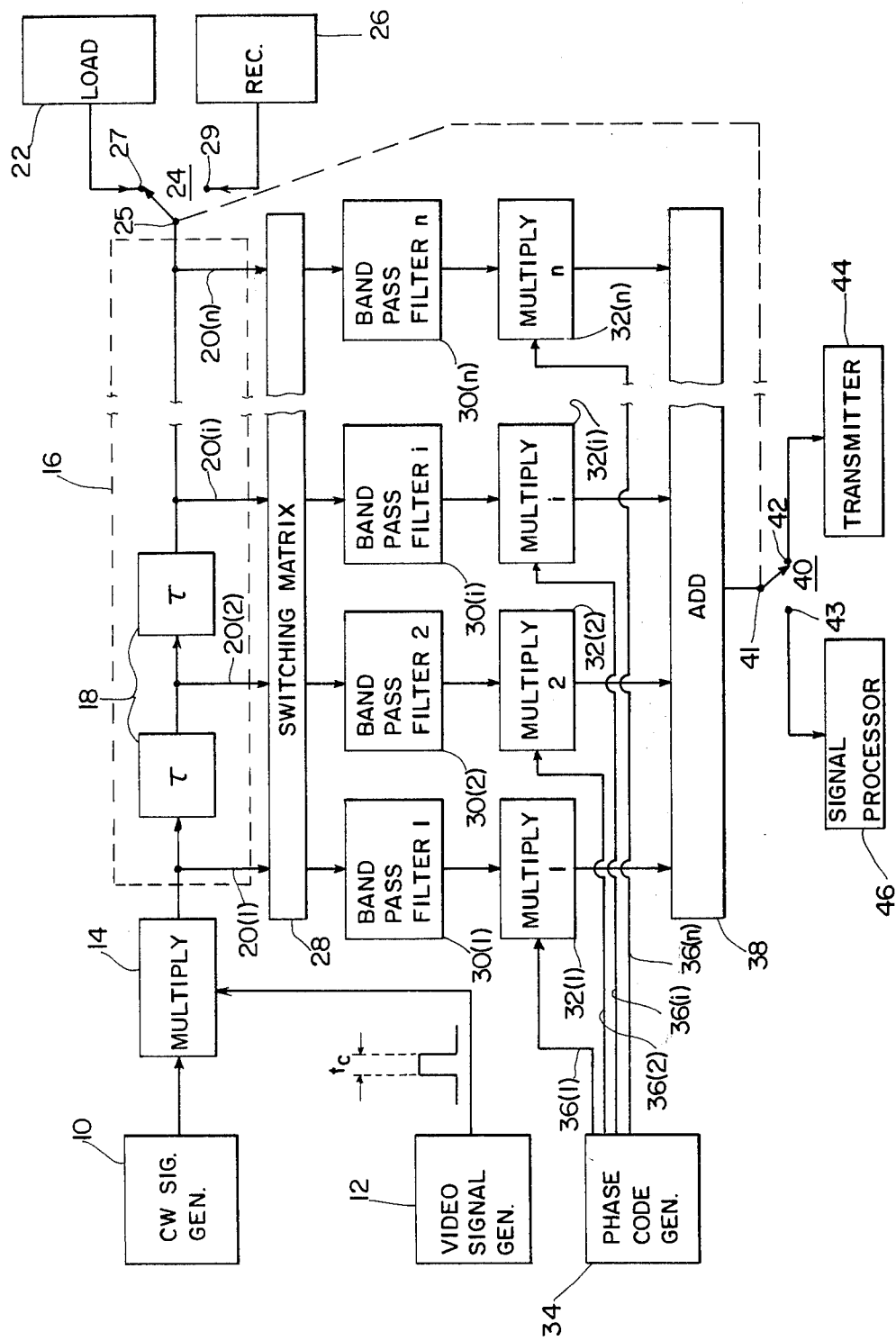
FIG. 1 is a block diagram representation of one embodiment of the present invention.

The present invention provides a device capable of generating many mutually orthogonal codes of arbitrary length in a form that is both doppler tolerant and which suppresses jamming. The invention is based on a modification of the well-known step approximation to a linear FM chirp pulse code. FIG. 1 illustrates one possible embodiment of a code generator for generating such modified linear FM chirp pulses.

Referring to FIG. 1, a continuous wave carrier signal generator 10 generates a carrier frequency signal $f_o$. This carrier signal $f_o$ is applied to one input of a multiplier 14. A video signal generator 12 generates a video pulse, i.e., a pulse with a signal spectrum ranging from dc up to some desired frequency limit, with a length which is less than or equal to the desired compressed pulse length $t_c$. This video pulse is applied to a second input of the multiplier 14. The multiplier 14 operates to multiply the carrier frequency $f_o$ by the video pulse resulting in the generation of sidebands on the carrier frequency $f_o$ equivalent to the spectrum of the video pulse. This pulse modulated carrier is then applied to a delay circuit with n signal taps spaced by equal delays $\tau$ for delaying the pulse modulated carrier by a series of equal delay increments. The delay circuit may be realized either digitally i.e., a shift register, for example, or with lumped constant delay lines. In the present embodiment, this delay circuit is realized by a tapped delay line represented by the dashed line box 16. This tapped delay line 16 comprises a series of n lumped constant delays 18 providing equal delays $\tau$. A signal tap 20 is taken before each delay element 18 and after the last delay element to yield a total of n signal taps. The output of the delay circuit 16 is also connected to the pole 25 of a single-pole double-throw switch 24 whose switching action is ganged with a second switch 40 to be discussed later. One terminal 27 of the switch 24 is connected to a nonreflecting load 22 such as, for example, a resistor with the characteristic impedance of the line. The other terminal 29 of the switch is connected to a radar receiver 26.

The n signal taps from the delay circuit 16 are applied to a filter band consisting of n bandpass filters 30 by way of a switching matrix 28 which will be discussed later. Each bandpass filter 30 passes a different set of spectral lines and has a bandwidth less than or equal to $1/\tau$. For convenience this filter bank may be a comb filter with each successive filter 30 tuned to a frequency higher than the previous filter by a frequency difference $\Delta f = B_f$ (the center frequency of the individual filters are separated by the bandwidth of the filters) such that the comb filter covers the peak of the main lobe of the exciting pulse spectrum. The output signals passed by the N filters 30 are applied through a set of multipliers 32 (to be discussed later) to an adder circuit 38 which operates to sum these output signals sequentially to form a single coded pulse of length $n\tau$. When the multiplexing switch 28 is connected such that the first signal tap 20(1) is connected to the first bandpass filter 30(1) in the comb filter and each successive signal tap 20 is connected to the next higher bandpass filter 30, and when the set of multipliers 32 are set to multiply by $+1$ to thereby provide zero phase shift to the signals passing therethrough, then the resulting coded output pulse from the adder 38 will be the familiar step approximation to the linear FM chirp pulse.

In order to provide a code which suppresses jamming and is also orthogonal, i.e., one with minimal cross correlation with other codes, the multipliers 32 may be controlled to provide designated phase shifts on each of the bandpass filter channel outputs such that a phase coded pulse is obtained after summing by adder 38.

By way of example and not by way of limitation, these multipliers may be set to multiply an incoming signal by $+1$ to thereby yield a phase code consisting of 0 degree and 180 degree phase shifts. Using these phase shift codings, there are a wide variety of phase coding combinations and sequences which can be used to obtain both code orthogonality and jamming suppression. Two codings having these characteristics are random and pseudorandom phase codings. The multipliers may be controlled to apply such a random or a pseudorandom phase modulation to the spectral lines of the transmitted pulse via the random or pseudorandom assignment of plus and minus values to the different multipliers 32.

The specific phase shifts applied by the multipliers 32 to their respective bandpass filter signals may be controlled by a phase code generator 34. This phase code generator 34 may be realized by circuitry as simple as a set of n single-pole switches that switch their respective multiplier 32 from a plus to a minus bias by means of control signals on lines 36(1) through 36(n). The phase code generator could also be realized by a shift register with feedback or by a read-only-memory programmed, for example, to provide a pseudorandom phase sequence to the multipliers 32.

It should be noted that although such phase codings suppress jamming and prevent crosstalk between radars, they have no bearing on the doppler tolerance of the resultant pulse.

After this phase coded pulse is formed by the addition in the adder 38 of the phase coded signals from the n bandpass filter channels, it is applied to a radar transmitter 44 for transmission via a single-pole double-throw switch 40. The adder 38 is connected to the pole 41 of the switch 40 while the transmitter 44 is connected to one position 42 of the switch and a signal processor 46 is connected to the other position 43 of the switch. After the coded pulse is transmitted, the ganged switches 24 and 40 are tripped to the receiver position 29 and the signal processor position 43, respectively. Any echoes from targets will return with the first transmitted frequency arriving first and the last transmitted frequency last with the time difference therebetween equal to the length of the tapped delay line 16. When the first echo frequency reaches the first signal tap 20(1) of the tapped delay line 16 and passes through its filter, all successive echo frequencies will be passing through their respective filters. The outputs from these filters will then pass through their respective multipliers. If the phase coding in the multipliers 32 comprise 0° and 180° phase shifts, i.e., multiplications by $+1$ and $-1$, then these signals may be multiplied by the very same numbers used during the transmission phase. Thus, where the multiplication was by $-1$, then another multiplication by $-1$ will yield a single $+1$ multiplication. Likewise, two successive $+1$ multiplications will correspond to a single $+1$ multiplication. Accordingly, the phase code will be decoded and the signal inputs to the adder 38 will add in-phase and the pulse compression system will thus act like a conventional compressor. However, if the phase coding is not matched, the phases of the spectral lines of the compressed pulse will be scrambled and the compressed pulse will not be formed.

When multiplications other than $+1$ or $-1$ are utilized such that a variety of phase angles $\theta$ are realized at the outputs of the multipliers 32, then after the transmission phase these multipliers must be controlled to yield the conjugate of the various $\theta$ phase angles generated during transmission in order to obtain proper pulse compression.

From the above, it should be clear that a variety of orthogonal pulse compression codes can be generated by this embodiment including random and pseudorandom codes. Accordingly, different orthogonal codes may be provided to different radars to reduce their mutual interference or a radar can have its code varied on a pulse-to-pulse basis to suppress jamming. It should be noted that since phase coding was performed on a step approximation to linear FM coded pulse, the resultant pulse will be inherently doppler tolerant.

An extension of the forgoing concept can be used to increase the number of degrees of freedom in the code and also to significantly increase the suppression of unwanted signals. This extension involves the use of a switching matrix 28 to change the order of the bandpass filter connections to the signal taps 20 in the tap delay line 16. Since n filters are used, this extension would permit a wide variety of orthogonal frequencies and phase coding combinations. Such code combinations will be less doppler tolerant than the step approximation to linear FM code. However, for reasonable dopplers up to mach 5 in surveillance radars (VHF band through L band) the doppler tolerance of such random frequency combination pluse codes is quite adequate.

If a particular radar application demands coded pulses with maximum doppler tolerance, then there are at least four basic frequency sequences which can be utilized. These frequency sequences are increasing linear (1, 2, 3, ... i ... n); decreasing linear (n, n−1, ... i ... 3, 2, 1); odd integer shifted one down (1, 3, 2, 5, 4, 7, 6, ... i ... n); and odd integer shifted one up (2, 1, 4, 3, 6, 5, 8, 7 ... i ... n).

Figure 2:
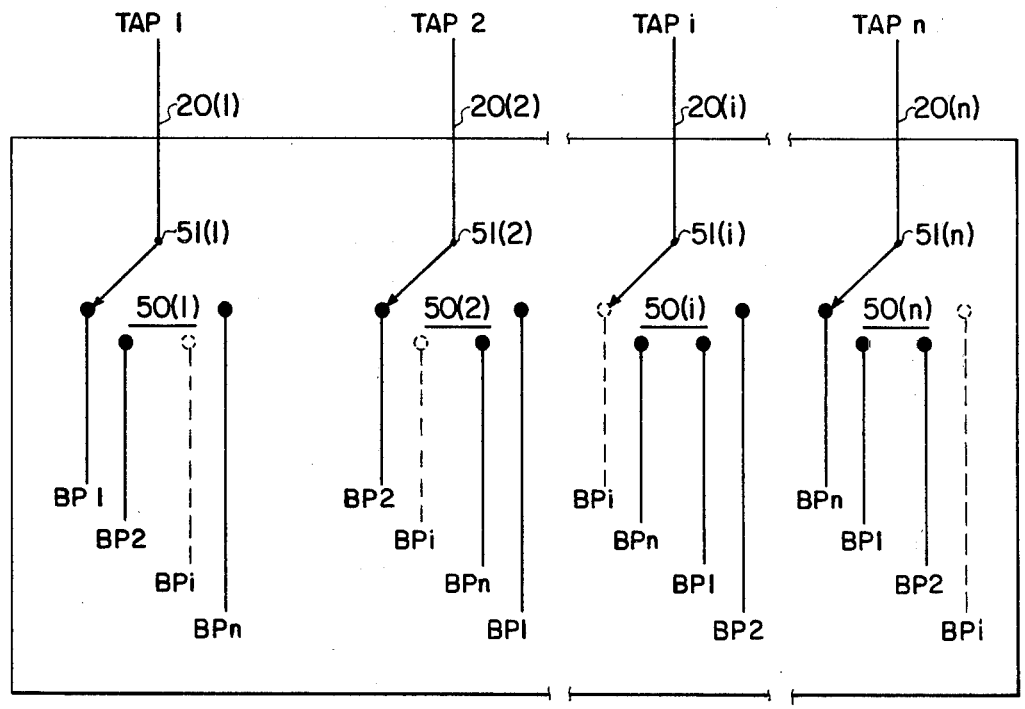
FIG. 2 is a schematic diagram of a switching circuit which may be utilized as the switching matrix shown in FIG. 1.

Switching matrix 38 may be realized by the circuit shown in FIG. 2. Each of the signal taps 20(1) through 20(n) is applied to the pole 51 of a single-pole n-position switch 50.

Each of the n positions is connected to a different one of the bandpass filters 30. Accordingly, by changing the positions of the n switches 50 it is possible to change the order of the filter connections to the signals taps in any desired fashion. This extra degree of freedom in the code provides a wide variety of new frequency and phase coding combinations.

The present invention is capable of the generation of a wide variety of doppler tolerant pulse compression codes having low cross-correlation code-to-code. Such codes permit the use of many wide band radars to share the same spectral space without mutual interference while also facilitating the suppression of jamming.

Obviously many modifications and variations of the present invention are possible in light of the above teachings. It is therefore to be understood that within the scope of the appended claims the invention may be practiced otherwise than as specifically described.

I claim:

1. A doppler tolerant pulse-compression-code generator for generating approximately orthogonal codes comprising:
   means for generating a signal pulse of bandwidth B;
   delay means with n signal taps spaced by equal delays $\tau$ for delaying the pulse generated by said pulse generating means by a series of equal delay increments;
   n bandpass filter channels approximately covering said bandwidth B such that each bandpass filter passes a different set of spectral lines;
   means for connecting each one of said n signal taps to a different one of said n bandpass filter channels;
   a phase coding circuit in each bandpass filter channel for phasing coding the signal passed by its respective bandpass filter channel; and
   means for adding the phase-coded signals from said n bandpass filter channels to form an orthogonal pulse.

2. A doppler-tolerant pulse-compression-code generator as defined in claim 1, wherein said pulse generating means comprises means for generating a video pulse.

3. A doppler-tolerant pulse-compression-code generator as defined in claim 1, further including a phase code control means for changing the phase shifts applied by said phase coding circuits in their respective filter channels.

4. A doppler-tolerant pulse-compression-code generator as defined in claim 3, wherein said phase code control means comprises a switching means for providing control voltage signals to each of said phase coding circuits to determine the phase code applied thereby.

5. A doppler-tolerant pulse-compression code generator as defined in claim 1, wherein each of said phase coding circuits comprises a multiplier.

6. A doppler-tolerant pulse-compression-code generator as defined in claims 1 or 3, wherein said connecting means comprises switching matrix for changing the order of the connections of the n bandpass filters to said n signal taps.

7. A doppler-tolerant pulse-compression code generator as defined in claim 6, wherein said switching matrix comprises n-position switch circuits, one n-position switch for each of said n signal taps, with each switch position connected to a different bandpass filter channel, for switching the signal on its respective signal tap to a bandpass filter channel different from the remaining signal taps from said delay means.

8. A method for generating approximately orthogonal doppler-tolerant pulse-compression codes which suppress jamming comprising the steps of:
   generating a signal pulse of bandwidth B;
   delaying said signal pulse by a series of n−1 equal delays $\tau$ and taking a signal before each delay and after the last delay to yield n signals;
   filtering each of said n sequentially delayed signals by a different bandpass filter in a comb filter approximately covering said bandwidth B;
   phase coding each of said n filtered signals; and
   adding the n phase-coded signals to form an orthogonal signal pulse.

9. A method as defined in claim 8, further comprising the step of changing the order of the filtering of the n sequentially delayed signals in said filtering step in order to generate a variety of pulse compression codes.

10. A method as defined in claim 9, further comprising the step of changing the phase shifts applied to each of said n filtered signals in said phase coding step in a controlled manner in order to generate a variety of pulse compression codes.

11. A doppler tolerant pulse-compression-code generator for generating approximately orthogonal codes comprising:
   means for generating a signal pulse of bandwidth B;
   delays means with n signal taps spaced by equal delays $\tau$ for delaying the pulse generated by said pulse generating means by a series of equal delay increments;
   n bandpass filter channels approximately covering said bandwidth B by means of n adjacent spectral bands;
   a switching matrix for connecting, in any desired order, each one of said n signal taps to a different one of said n bandpass filter channels, and
   means for adding the delayed signals from said n bandpass channels to form an expanded pulse.

12. A doppler-tolerant pulse-compression code generator as defined in claim 11, wherein said switching matrix comprises a plurality of n-position switch circuits, one n-position switch circuit for each of said n signal taps, with each switch position connected to a different bandpass filter channel, for switching the signal on its respective tap to a bandpass filter channel different from the remaining signal taps from said delay means.

13. A doppler-tolerant pulse compression code generator as defined in claim 11, wherein each successive filter channel from 1 to n is tuned to a frequency higher than the immediately preceding filter channel by a set frequency differential; and wherein said switching matrix includes means for connecting said n filter channels to said n signal taps in the order 1, 3, 2, 5, 4, 7, 6, . . . i. . . n.

14. A doppler-tolerant pulse compression code generator as defined in claim 11, wherein each successive filter channel from 1 to n is tuned to a frequency higher than the immediately preceding filter channel by a set frequency differential; and wherein said switching matrix includes means for connecting said n filter channels to said n signal taps in the order 2, 1, 4, 3, 6, 5, 8, 7, . . . . i . . . n.

15. A method for generating approximately orthogonal doppler-tolerant pulse-compression codes which suppress jamming comprising the steps of:
generating a signal pulse of bandwidth B;
delaying said signal pulse by a series of n−1 equal delays $\tau$ and taking a signal before each delay and after the last delay to yield n signals;
switching each of said n sequentially delayed signals to a different bandpass filter in a comb filter in a first switching order;
filtering each of said n sequentially delayed signals in the bandpass filter to which it was switched;
adding the n delayed, filtered signals to form a first expanded signal pulse; and
then switching each of said sequentially delayed signals to a different bandpass filter in the comb filter in a second switching order to yield a second expanded signal pulse approximately orthogonal to said first expanded signal pulse.

* * * * *